Aug. 26, 1969     R. W. RACINE ET AL     3,463,539
CONVERTIBLE LOUNGE, TABLE AND SEAT ARRANGEMENT FOR VEHICLE
Filed June 14, 1967     4 Sheets-Sheet 1

INVENTORS
RICHARD W. RACINE
MAX E. COLCHIN

ATTY

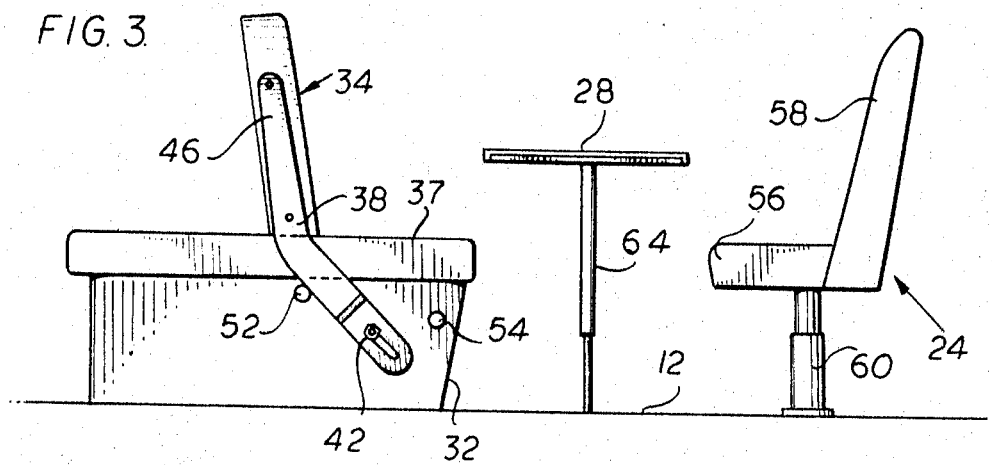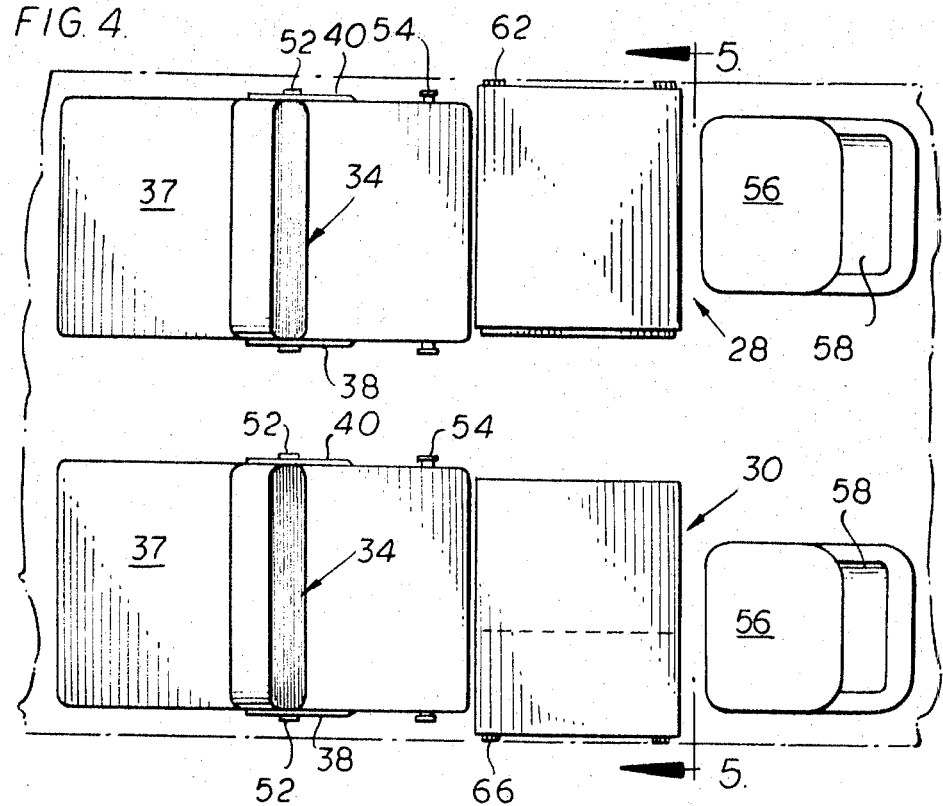

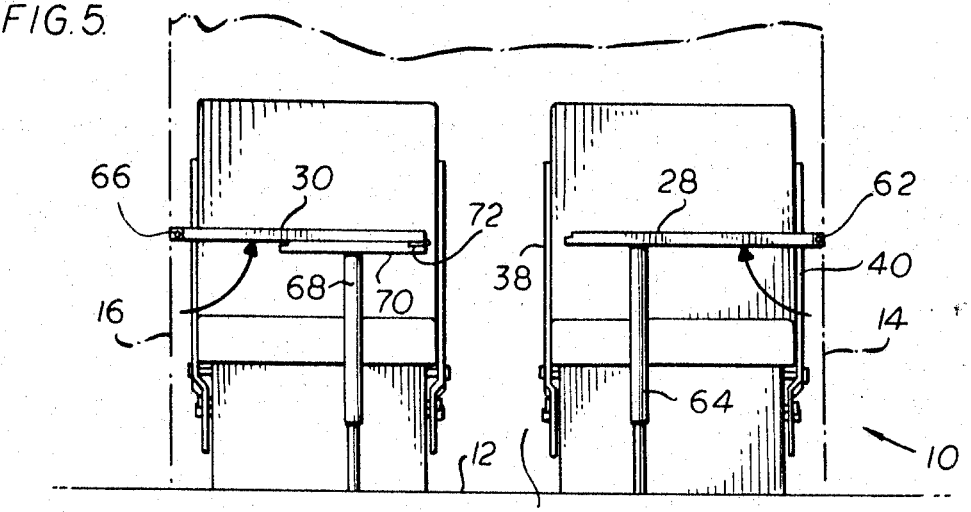
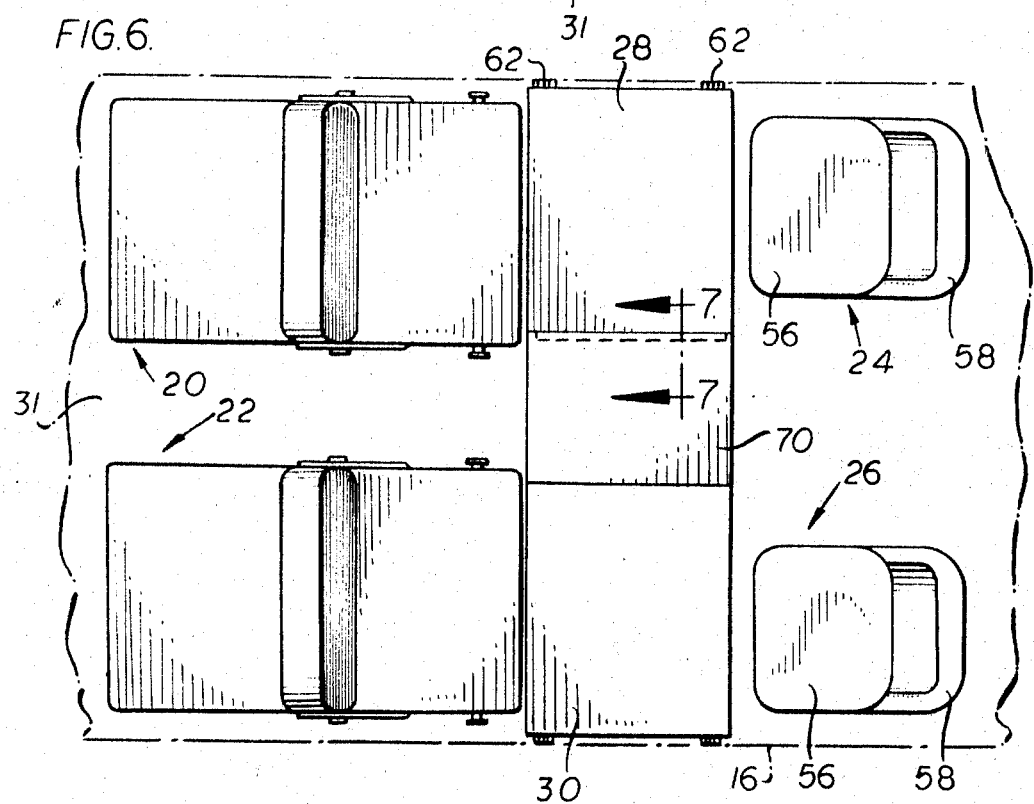
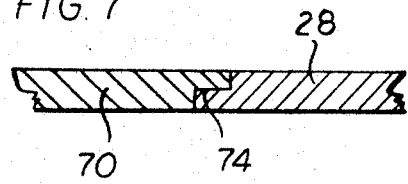

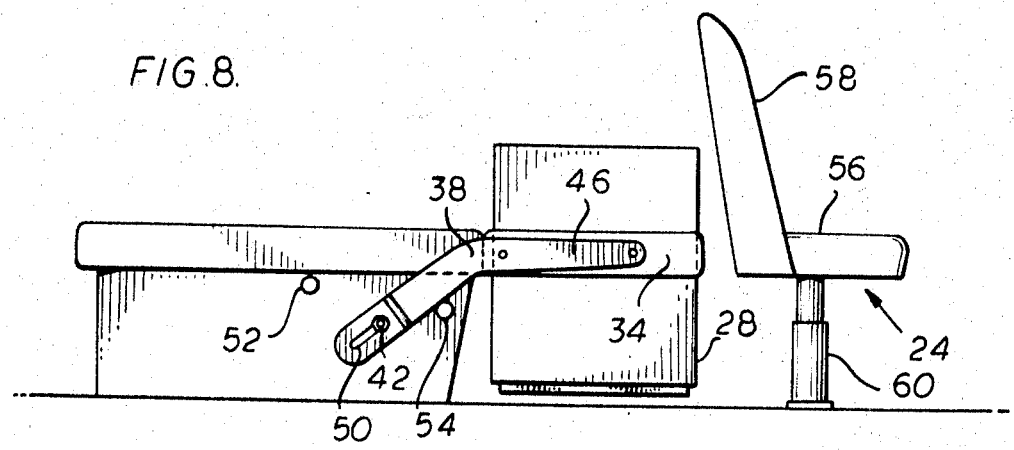
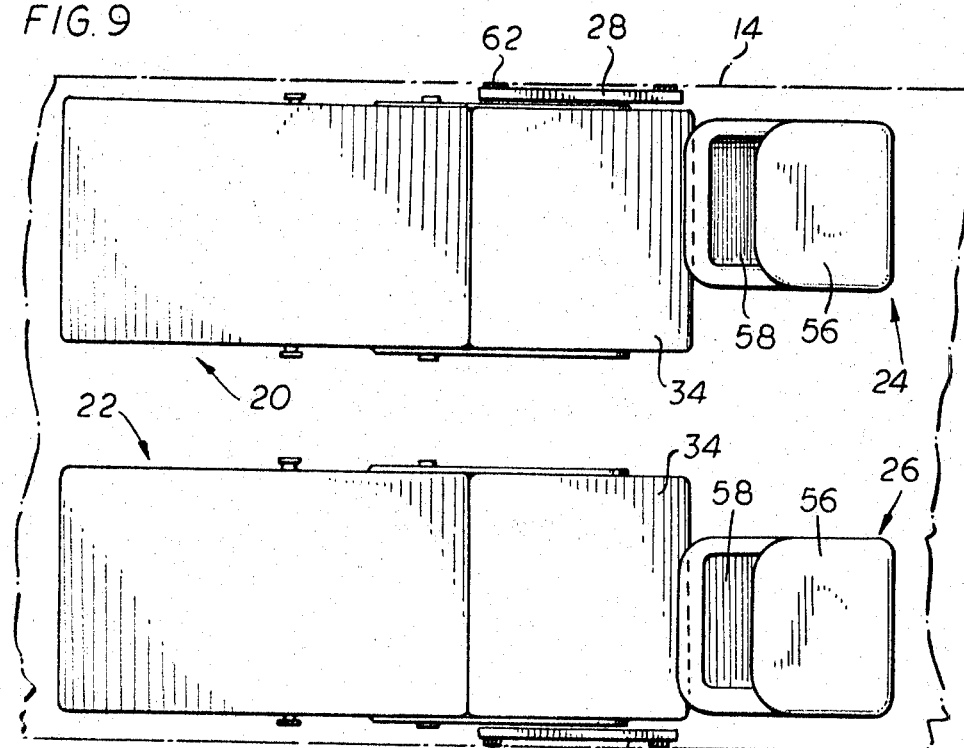
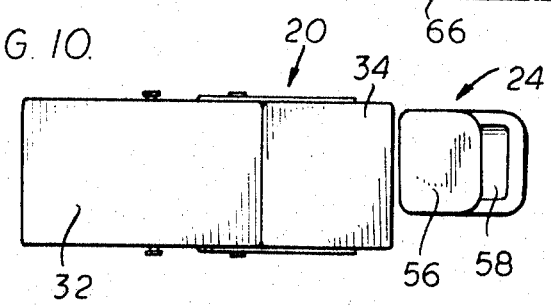

United States Patent Office 3,463,539
Patented Aug. 26, 1969

3,463,539
CONVERTIBLE LOUNGE, TABLE AND SEAT ARRANGEMENT FOR VEHICLE
Richard W. Racine and Max E. Colchin, Fort Wayne, Ind., assignors to International Harvester Company, Chicago, Ill., a corporation of Delaware
Filed June 14, 1967, Ser. No. 646,074
Int. Cl. B60p *3/36;* B60n *1/06, 1/10*
U.S. Cl. 296—23                 6 Claims

ABSTRACT OF THE DISCLOSURE

An arrangement of lounges, tables and seats for a vehicle having restricted quarters to provide a number of alternative arrangements to serve different functions depending on the occasion. The arrangement includes seat units convertible to a lounge, foldable table panel sections and additional seat units which may be utilized for multiple purposes.

---

This invention relates to articles of furniture which may be combined in a number of alternative ways to serve different functions.

In certain environments where space is at a premium such as in vehicle campers, boats and other restricted areas it is sometimes feasible to provide furniture units designed and arranged so that they may serve different functions.

A principal object of the present invention is to provide in an area having restricted quarters, such as a vehicle camper unit, an arrangement of furniture units which can be disposed in a number of alternative ways to serve a number of different functions.

Another object is to provide a table and seat arrangement which can be converted into a lounge or bed.

A further object is to use the front seats of a motor vehicle, such as a vehicle camper, as part of a dining arrangement or as part of a lounge or bed.

The above and other objects and advantages of the invention will be more readily apparent when read in conjunction with the accompanying drawings in which:

FIGURE 3 is a side view of the arrangement shown in FIGURE 2 showing the table in a service position and the second seat facing toward the table;

FIGURE 4 is a plan view of two arrangements of the type shown in FIGURE 3 disposed against opposite sidewalls of a vehicle camper unit;

FIGURE 5 is a view in elevation taken along the line 5—5 of FIGURE 4;

FIGURE 6 is a plan view similar to that shown in FIGURE 4 but showing the tables interconnected by a center panel to provide a single table extending from wall to wall;

FIGURE 7 is a partial view in section taken along line 7—7 of FIGURE 6 showing the overlapping connection between a center panel and one of the tables;

FIGURE 8 is a side view of the units shown in FIGURE 2 showing the convertible lounge and seat unit converted to a lounge;

FIGURE 9 is a plan view of two arrangements of the type shown in FIGURE 8;

FIGURE 10 is a plan view of one of the arrangements of FIGURE 9 in which the second seat is turned to face the lounge unit to form an extension of the lounge.

Figure 1:
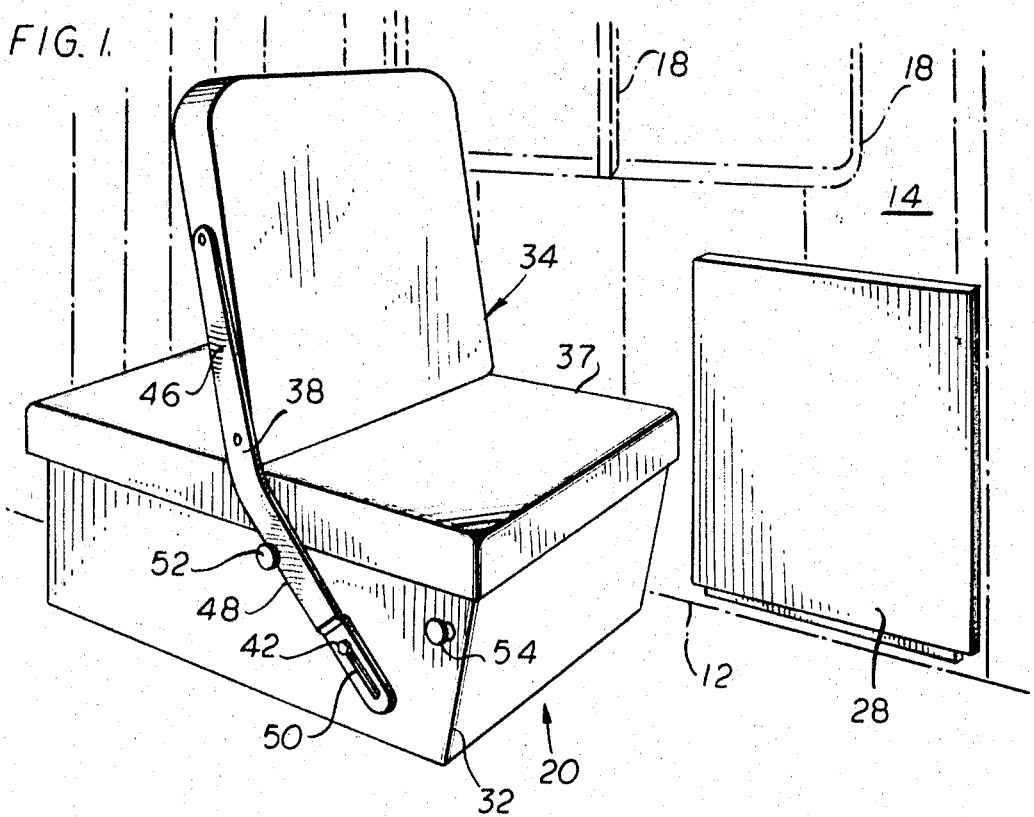
FIGURE 1 is a perspective view of a convertible lounge and seat unit shown disposed along a vehicle sidewall and a foldable table attached to the sidewall.

Referring now to the drawings wherein like reference characters designate similar parts in the several views there is shown a portion of a structure of a vehicle 10 such as that generally shown, for example, in U.S. Patent 3,184,766 issued May 25, 1965. Such vehicles are sometimes referred to as motor homes, vehicle campers or by other similar and appropriate designations. The vehicle 10 includes generally a floor section 12 and sidewalls 14 and 16 shown diagrammatically in FIGURE 5. The sidewalls may have windows 18 formed therein. The furniture in the vehicle comprises a pair of fore and aft extending similar convertible lounge and seat assemblies 20 and 22 disposed respectively alongside the sidewalls 14 and 16, a pair of normally forwardly facing seats 24 and 26, and a pair of tables 28 and 30 disposed between the convertible lounge and seat assemblies and the seats 24 and 26.

The convertible lounge and seat assemblies 20 and 22 are laterally spaced from each other to define an aisle 31 therebetween. The assembly 20 comprises a lounge unit 32 and a combination member 34 which may function as a seat back-rest as shown in FIGURE 1 and as an extension of the lounge unit 32.

The lounge unit 32 is a generally rectangular shaped unit having a frame structure 36 on which may be supported an upholstered cushion seat 37. The frame structure 36 may be a metal box-like structure which may have provided thereon attachment means (not shown) for anchoring the lounge unit to a floor.

Figure 2:
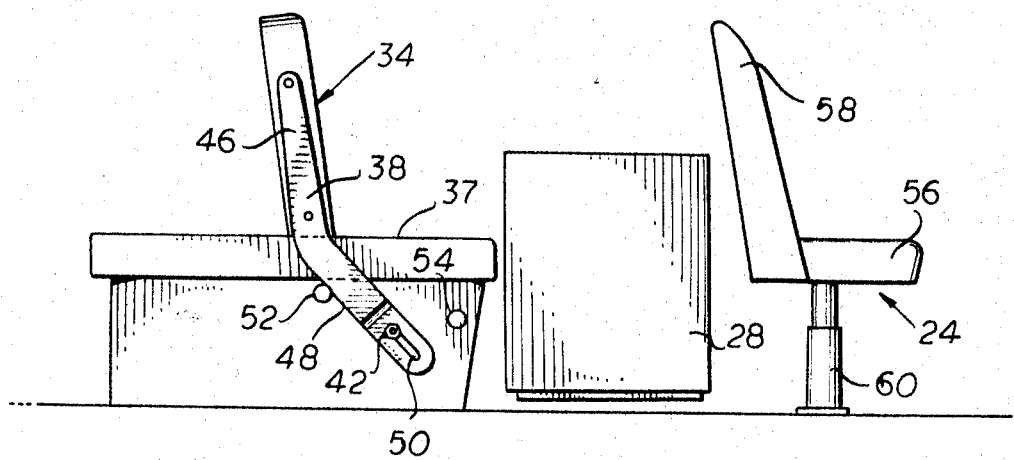
FIGURE 2 is a side view of the convertible lounge and seat unit of FIGURE 2 together with a table and a second seat arranged in tandem relation.
Figure 2:

The combination member 34 comprises a generally rectangular member to which are connected a pair of arm members 38 and 40 which pivotally support the combination member 34 on the frame structure 36 by means of pivotal connections 42 and 44 in the form of a bolt or pin. Each of the arm members 38 and 40 includes an upper portion 46 which is permanently fixed to the member 34 and a lower portion 48, formed at an angle to the upper portion 46. A slot 50 is formed in the lower portion 48 to receive the bolt or pin 42 therethrough which serves as the pivotal mounting. The slot 50 permits the combination member to be lifted from its position as shown in FIGURES 1 and 2 where it functions as a back-rest and pivoted to a substantially horizontal position as shown in FIGURE 8 in which position it functions as part of the lounge unit 32 or in other words as a lounge extension. Stop members 52 and 54 are secured to the frame structure 36 and are effective to help position the combination member 34 in its back rest and lounge extension positions respectively by supporting the edges of the arm member 38 as clearly seen in FIGURES 2 and 8. The construction and operation of the arm member 40 is similar, of course, to the arm member 38. The assembly 22 is similar to the assembly 20 and is constructed and operates in the same way. Further explanation of the assemblies 20 and 22 would appear to be unnecessary in view of the more detailed description of such a unit in the above-mentioned copending application.

Also included in the arrangement of this vehicle are the pair of normally forwardly facing seats 24 and 26, each comprising a seat portion 56 and a back 58. The seat 24 would normally be the driver's seat on the left side. Each of these seats can be moved to a rearwardly facing position. They are here shown as being pivotally mounted on the floor 12 for rotation about a vertical pivot means 60 mounted on the floor 12. It is contemplated that other appropriate means might also be used to enable these seats to be moved between forwardly and rearwardly facing positions.

The vehicle also includes tables 28 and 30, which, as here shown, are pivotally mounted on the opposing sidewalls 14 and 16. These tables may be folded out of the way against the respective sidewalls to which they are connected. Pivotal hinge connections 62 connect the table 28 to sidewall 14. A support arm 64 is provided to extend between the underside of table 28 and the floor 12 to support the table in a service position as seen in FIGURES 3 and 5. As clearly seen from FIGURES 3 and 4, table 28 when swung into a service position, is disposed between lounge unit 32 and seat 24 so that the table can be used by persons sitting on either side thereof. The table 30 is similarly mounted on the opposite sidewall 16 by pivotal connection 66. A support arm 68 is provided to extend between the underside of table 30 and the floor 12 to support table 30 in a service position. In their released positions, the table panels 28 and 30 swing down and hang alongside the walls 14 and 16.

A table extension 70 is hinged to one of the two table panels 28 or 30. It is shown in FIGURE 5 as hinged to table 30 by hinge 72. This table extension 70 may be swung into connecting relation with the other table panel 28 by an interlocking connection such, for example, as shown at 74. The extension 70 spans the aisle 31 to form a table extending completely across the vehicle 10 from wall to wall as shown in FIGURE 6. With the seats 24 and 26 positioned in a rearwardly facing position as seen in FIGURE 6, a seating arrangement for four people at a fully extended table is provided.

In FIGURES 8 and 9 the tables 28 and 30 are shown in their stored positions against the walls permitting the combination member 34 to be pivoted into a horizontal position to form an extension of lounge unit 32.

As further shown in FIGURE 10, if the normally forwardly facing seat 24 is positioned to face rearwardly, it can function as an additional extension of the convertible lounge and seat assembly 20 when the combination member is in a horizontal position. The same is true when seat 26 is positioned rearwardly in relation to the assembly 22.

Thus it is apparent that I have advantageously provided a combination of lounge, table and seat units for use in restricted quarters which can be manipulated to provide a plurality of alternative arrangements. These arrangements include lounge units with extensions, seat and table arrangements for dining facilities or other activities, and seating facilities for driver and passengers which are convertible to lounge units. While the arrangements herein have been described particularly in association with a vehicle camper unit, it is contemplated that these arrangements might well be utilized in other environments where quarters are restricted such, for example, as in boats.

While certain embodiments of the invention have been specifically disclosed, it is to be understood that the invention is not limited thereto as other variations will be apparent to those skilled in the art, and the invention is to be given its fullest possible interpretation within the terms of the following claims.

I claim:
1. In a motor vehicle having a floor and two sidewalls the combination comprising:
a pair of fore and aft extending lounge units disposed in the vehicle adjacent each of the sidewalls and laterally spaced from each other to define a fore and aft extending aisle between said lounge units;
seat back-rest units pivotally mounted on each of said lounge units and adapted to assume first and second positions;
said lounge units and said seat back-rest units in their first position defining forwardly facing seating arrangement, and said lounge units and said seat back-rest units in their second position defining extended lounges; and table means connected to the vehicle structure and adapted to be moved into a transversely extending position at the forward end of said lounge units, said table means including two table panel sections each adapted to be mounted on the opposite sidewalls, and means for pivotally connecting each of said table panel sections to the sidewalls in a manner so that the panel sections may be swung in a vertical plane and folded against the sidewalls when not in use.

2. The combination of claim 1 including
a third panel section attached to one of said two table panel sections and connectible to the other of said two table panel sections to thereby form a table extending transversely from one sidewall of the vehicle to the other sidewall.

3. In a motor vehicle having a floor and a pair of transversely spaced, generally vertical and longitudinally extending sidewalls,
a longitudinally extending lounge unit disposed adjacent to a respective one of said sidewalls; a seat back-rest unit connected to said lounge unit for swinging movement between a first, generally upright position wherein said lounge unit and said seat back-rest unit define a forwardly facing seat and a second, generally horizontal position wherein said seat back-rest unit defines a first longitudinal extension of said lounge unit; a seat unit longitudinally spaced forwardly of said lounge unit including a generally horizontally disposed seat portion and a generally upright back-rest portion; and means for supporting said seat unit on the vehicle floor, said means permitting said seat unit to be bodily moved with respect to said lounge unit between a normal forwardly facing position and a rearwardly facing position wherein an edge of said seat portion of said seat unit is adjacent the forwardmost edge of said seat-back unit when in its second position to define a second extension of said lounge unit.

4. The combination as set forth in claim 3, wherein said seat unit is supported on said vehicle floor for swinging movement between its normal forwardly facing and rearwardly facing positions about a generally vertical pivotal axis.

5. The combination as set forth in claim 3, including table means operatively connected to one of said vehicle sidewalls, said table means including a panel section movable between a stored position wherein said panel section is vertically disposed adjacent said one of said vehicle sidewalls and a service position wherein said panel section is horizontally disposed and positioned between and above said lounge unit and said seat portion of said seat unit when said seat unit is in its rearwardly facing position and said seat back-rest unit is in its first, generally upright position.

6. The combination as set forth in claim 5, wherein said panel section is pivotally connected to said one of said sidewalls for swinging movement between its stored and service positions about a generally horizontal, longitudinally extending axis, said panel section extending transversely from said one of said sidewalls when in its service position.

References Cited

UNITED STATES PATENTS

| | | | |
|---|---|---|---|
| 3,097,876 | 7/1963 | Willson | 296—23 |
| 3,284,127 | 7/1966 | Willson | 296—23 |
| 1,087,540 | | Kennedy | 296—64 |
| 1,832,767 | 11/1931 | Dameron | 296—23 |

PHILIP GOODMAN, Primary Examiner

U.S. Cl. X.R.
297—232; 296—69